April 29, 1924.                                                                 1,492,121
F. V. D. CRUSER ET AL
ELECTROLYTIC CELL
Original Filed Dec. 30, 1921      2 Sheets-Sheet 1
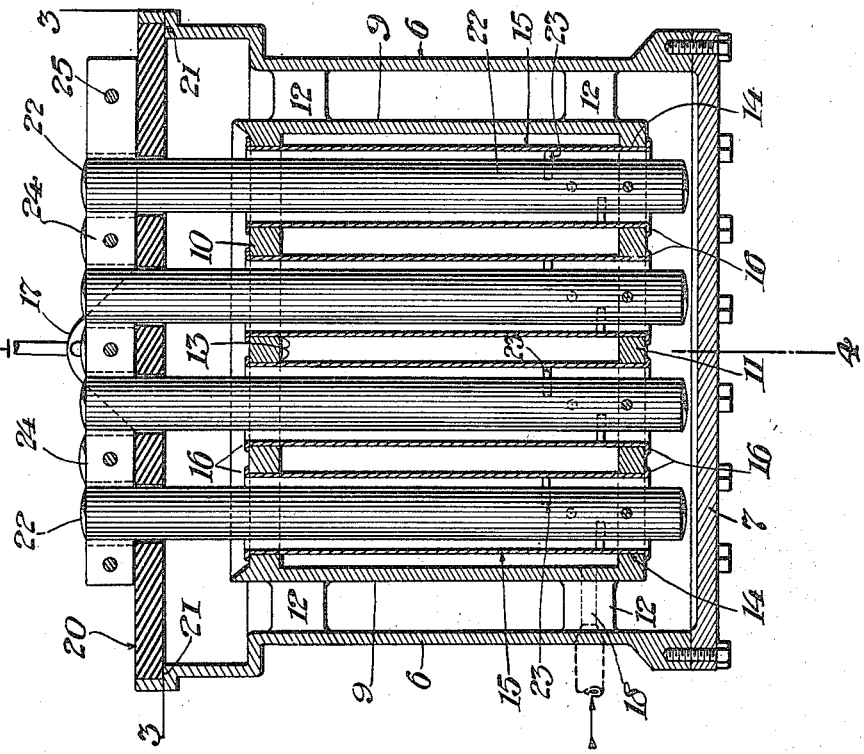
Inventors,
Frederick V.D. Cruser
Carl C. Haferkamp
by their Attorney
John R. Nolan

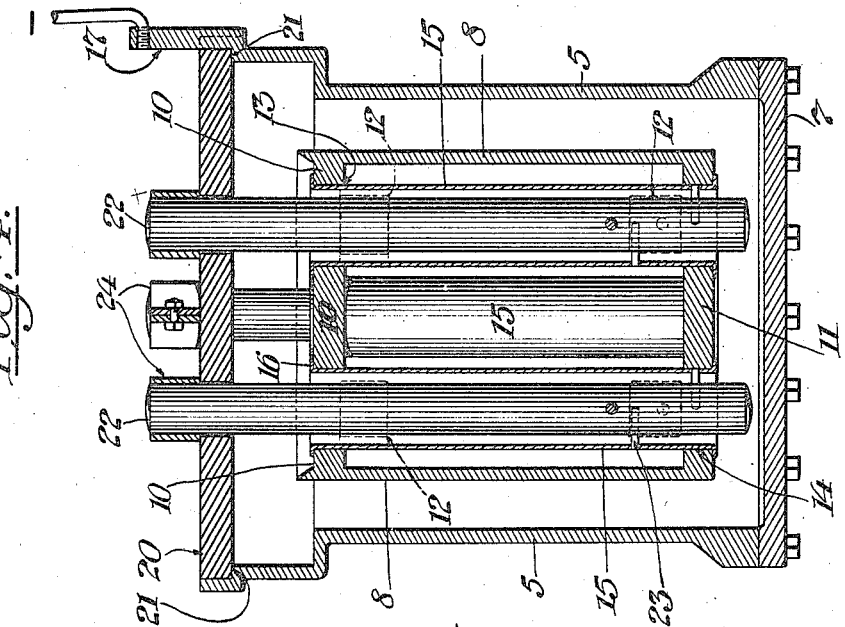
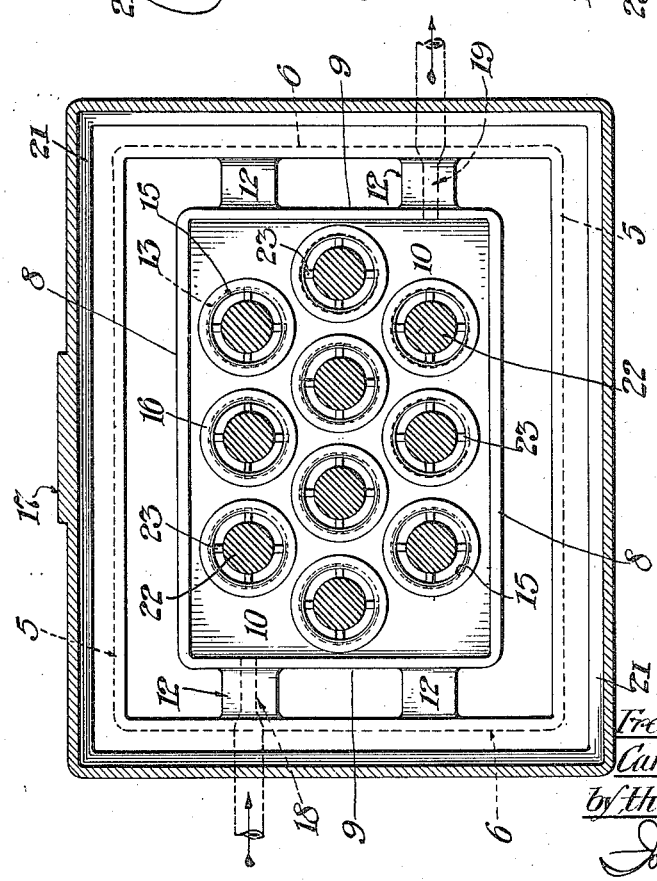

Patented Apr. 29, 1924.

1,492,121

UNITED STATES PATENT OFFICE.

FREDERICK V. D. CRUSER AND CARL CLEMENS HAFERKAMP, OF OSWEGO, NEW YORK, ASSIGNORS TO THE DIAMOND MATCH COMPANY, OF CHICAGO, ILLINOIS, A CORPORATION OF ILLINOIS.

ELECTROLYTIC CELL.

Application filed December 30, 1921, Serial No. 525,990. Renewed March 13, 1924.

*To all whom it may concern:*

Be it known that we, FREDERICK V. D. CRUSER, a citizen of the United States, and CARL C. HAFERKAMP, a citizen of Germany, both residents of the city of Oswego, in the county of Oswego and State of New York, have invented certain new and useful Improvements in Electrolytic Cells, of which the following is a specification.

This invention relates to electrolytic apparatus; having reference to that class of apparatus wherein the electrolyte is caused to flow directly between and in contact with spaced electrodes, and more especially to that type of apparatus wherein a carbon anode and a base metal cathode are employed.

In the practical operation of electrolytic apparatus, particularly in the production of chlorates, great heat is generated in the cell, and in consequence the electrodes, particularly anodes composed of carbon, are rapidly disintegrated and destroyed. In order to keep the temperature of the electrolyte at as an effective low point as possible, the contents of the cell have heretofore been cooled in different ways; in some cases by controlling the temperature of the incoming electrolyte solution and its rate of flow, and in others by immersing cooling coils in the solution.

An object of our invention is to provide a cell with a chambered cathode of such character that a cooling fluid can be introduced in the chamber and the temperature of the electrolyte be thereby readily controlled and maintained at a relatively low effective point.

A further object of our invention is to provide such a cell with a novel construction and arrangement of cathode and anode elements whereby the active areas of the respective elements are materially increased.

With these and other objects in view our invention comprises, in an electrolytic cell, novel features of construction and combinations of parts which will be hereinafter described and claimed.

In the drawings—

Figure 1 is a perspective view of an electrolytic cell embodying a preferred form of our invention.

Fig. 2 is a longitudinal vertical section thereof.

Fig. 3 is a horizontal section of the apparatus on the line 3—3 of Fig. 2.

Fig. 4 is a vertical section at right angles to Fig. 2, as on the line 4—4 of Fig. 2.

Referring to the drawings, 5 designates the sides; 6 the ends and 7 the bottom of a rectangular cell body, preferably of cast iron. Within this body is arranged, in spaced relation to its side and end walls and bottom, another body comprising sides 8, ends 9, a top 10, and a bottom 11; the interior of said latter body constituting a chamber for a cooling liquid, as will be hereinafter described. In the present instance the chambered structure is an integral part of the cell body, the two members being united by suitably-disposed upper and lower connecting portions 12 therebetween.

In the top and bottom of the chambered structure are two corresponding series of apertures 13, 14, respectively, in which the respective ends of a corresponding series of vertically-disposed cylindrical metal tubes 15 are snugly entered. In the present instance, the outer ends of each tube are closely swaged against the opposing surfaces of the top and bottom of the structure, as at 16. Thus the cooling chamber is provided with a plurality of spaced-apart parallel ducts which establish communication between the spaces of the electrolytic chamber above and below the chambered structure, respectively. The cell body together with the inner chambered structure and its tubes, constitute the cathode, one side of the body being conveniently provided with a lug 17, for the negative terminal. By this construction the inner walls of the tubes constitute a multiplicity of cathode surfaces of extended active area.

Three rows of cathode tubes are illustrated, the outer rows each comprising three tubes and the middle row four tubes; but the number of rows and the number of tubes in each row may be reduced or increased as the capacity of the cell may require.

Provision is had whereby the cooling liquid can be supplied to and circulated through the chamber of the cathode so as to contact with and absorb heat from the immersed tubes and the inner walls of the chamber. In the present instance one of the lower and one of the upper connecting portions 12 are perforated from the exterior of the cell body to the cooling chamber to provide inlet and outlet ports 18, 19, respectively, for water or other suitable cooling liquid.

The cell is provided with a cover 20, preferably of slate, which is removably supported on ledges or shoulders 21 adjacent the upper edges of the sides of the cell body. Depending from the cover, centrally into and through the respective tubes 15, are cylindrical carbon anode members 22, the lower ends whereof are slightly spaced from the bottom of the cell body. The anode members are of less diameter than the interior of the cathode tubes, and suitable insulators 23 are positioned in each tube in order to maintain the encircled member in spaced parallel relation to the walls of the tube. The upper ends of the anode members of each row extend through perforations in the cover and are rigidly clamped between pairs of metallic conducting bars 24. The bars of the respective members are united at one end by a coupler comprising, in the present instance, a screw-threaded conducting rod 25 provided with clamp nuts 26 for the respective bars; one end of this rod being electrically connected with the positive conducting wire.

From the foregoing it will be seen that when the electrolytic chamber of the cell is supplied with electrolyte the solution envelops the anode members within as well as below and above the tubes and is thus free to circulate through the annular ducts within the tubes during the electrolytic operation. In this operation, particularly in the production of chlorates, great heat is generated between the active anode and cathode surfaces, but owing to the influence of the cooling liquid on the cathode surfaces they can be maintained at a relatively low effective temperature, by regulating the temperature of the inflowing cooling fluid and its flow through the chamber. By the multiple electrode construction described the cooling medium absorbs the excess heat in the region where the heat is generated, and thus functions to minimize the destructive action of the heat on the electrode, particularly on the carbon anode members, which as is understood, are disintegrated and destroyed in proportion to the excess rise of temperature of the electrolyte. Moreover the cooling of the electrolyte at the proximate cathode surfaces contributes to the upward circulation of the electrolyte through the annular spaces between the active anode and cathode surfaces, thus ensuring an upward flow of the hydrogen bubbles and precluding their settling on and polarizing the cathode.

It is to be understood that our invention is not limited to the particular details of construction herein shown and described as the apparatus may be modified within the principle of our invention and the scope of the appended claims; thus, for example, the forms of the associated cathode and anode members may be varied and the chamber for water or other cooling liquid may be formed in the walls of the cell body.

We claim—

1. In an electrolytic cell, a cathode structure comprising a container for electrolyte, and a container for a circulating cooling medium, the latter container being located within and spaced from the vertical walls of the former container and presenting extended vertical cooling surfaces to the electrolyte in said former container.

2. A cell having an electrolytic chamber, an anode and a cathode, the cathode comprising a body having a cooling chamber therein independent of the electrolytic chamber, and the anode comprising a member slightly spaced from and in substantial parallel relation to a cathodic wall of said cooling chamber.

3. A cell having an electrolytic chamber, an anode and a cathode, the cathode comprising a body having a cooling chamber therein independent of the electrolytic chamber and provided with inlet and outlet ports for a cooling liquid, and the anode comprising a member slightly spaced from and in substantial parallel relation to a cathodic wall of said cooling chamber.

4. A cell comprising an electrolytic chamber, an anode and a cathode, the active surfaces of said anode and cathode being longitudinally disposed and in slightly spaced parallel relation to each other, and the cathode including a chamber through which a cooling liquid can be freely circulated during the electrolytic operation, said latter chamber being independent of the electrolytic chamber.

5. A cell comprising an electrolytic chamber, an anode and a cathode, the anode including a cylindrical member, and the cathode including a cylindrical member through which the anode member extends in spaced parallel relation to the inner wall of the cathode member, said cathode also including a chamber which surrounds said tubular member and is adapted to receive a cooling liquid.

6. In an electrolytic cell, a cell body, a chambered structure therein for the reception of a cooling medium, said structure having a hollow cathode member within the chamber, and an anode member extending into said hollow cathode member in spaced relation to the wall of the latter.

7. In an electrolytic cell, a cell body, a chambered structure therein for the reception of a cooling medium, said structure including a plurality of cathode tubes extending through said chamber, and a plurality of anode members extending into said tubes in spaced parallel relation to each other.

8. In an electrolytic cell, a cell body, a chambered cathode structure supported therein in spaced relation to the walls of the cell body, said structure including a plurality of cathode tubes extending through the chamber of said structure and affording communication between the lower and upper portions of the cell, means whereby cooling liquid can be supplied to and discharged from said chamber, and a plurality of anode members extending respectively into said tubes in spaced relation to the walls of the latter.

9. In an electrolytic cell, a cell body, a chambered cathode structure supported therein in spaced relation to the walls of the cell body, said structure including perforated top and bottom portions and a plurality of cathode tubes extending through said chamber and fitted in the perforations of the said top and bottom portions, so as to afford communication between the lower and upper portions of the cell, a cover for the cell body, and a series of anode members depending from said cover into said tubes and in spaced relation to the walls of the latter.

10. In an electrolytic cell, a cathode comprising a chambered body through the chamber of which a cooling liquid can be circulated, and a hollow cathode member extending through said chamber and spaced from the walls thereof but electrically connected at its respective ends with the top and bottom of said body.

11. In an electrolytic cell, a cathode comprising a hollow body having top and bottom portions, means for circulating water through said body, and a series of hollow cathode members located within said body and affording passages opening through said top and bottom portions, said members being spaced from each other and from the walls but electrically connected with the top and bottom portions of said body.

FREDERICK V. D. CRUSER.
CARL CLEMENS HAFERKAMP.